United States Patent
Fox

[11] 3,903,693
[45] Sept. 9, 1975

[54] ROCKET MOTOR HOUSING

[76] Inventor: Anthony Fox, 8306 Queen Ave. South, Minneapolis, Minn. 55431

[22] Filed: Mar. 26, 1973

[21] Appl. No.: 344,615

[52] U.S. Cl............... 60/200 R; 60/258; 60/39.46; 60/39.32
[51] Int. Cl. .............................................. F02k 9/02
[58] Field of Search .......... 60/39.46, 258, 257, 227, 60/218, 39.32, 200 R; 252/477

[56] References Cited
UNITED STATES PATENTS

| | | | |
|---|---|---|---|
| 2,720,079 | 10/1955 | Mines | 60/39.32 |
| 2,721,788 | 10/1955 | Schad | 60/39.46 |
| 2,972,227 | 2/1961 | Allen | 60/39.46 X |
| 3,135,703 | 6/1964 | Sill | 60/39.46 X |
| 3,581,504 | 6/1971 | Andrus | 60/259 |
| 3,618,324 | 11/1971 | Munding | 60/39.46 X |
| 3,695,041 | 10/1972 | Eggers et al. | 60/39.46 |

*Primary Examiner*—Carlton R. Croyle
*Assistant Examiner*—Robert E. Garrett
*Attorney, Agent, or Firm*—Orrin M. Haugen

[57] ABSTRACT

Rocket motor housing means comprising a casing enclosing an inlet, a combustion chamber, and exhaust nozzle means. The casing is formed in two mating segments, a forward segment and a rearward segment, with releasable coupling means being provided at the juncture of the segments, the coupling means being arranged to engage and retain the opposed outer radially outwardly directed surfaces of annular rings formed along the juncture point for the two segments.

3 Claims, 4 Drawing Figures

PATENTED SEP 9 1975 3,903,693
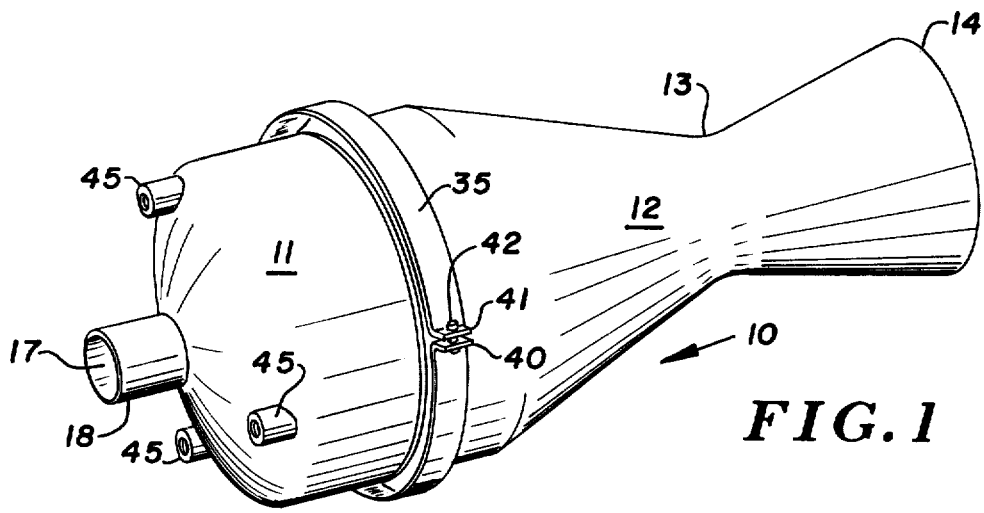
FIG.1
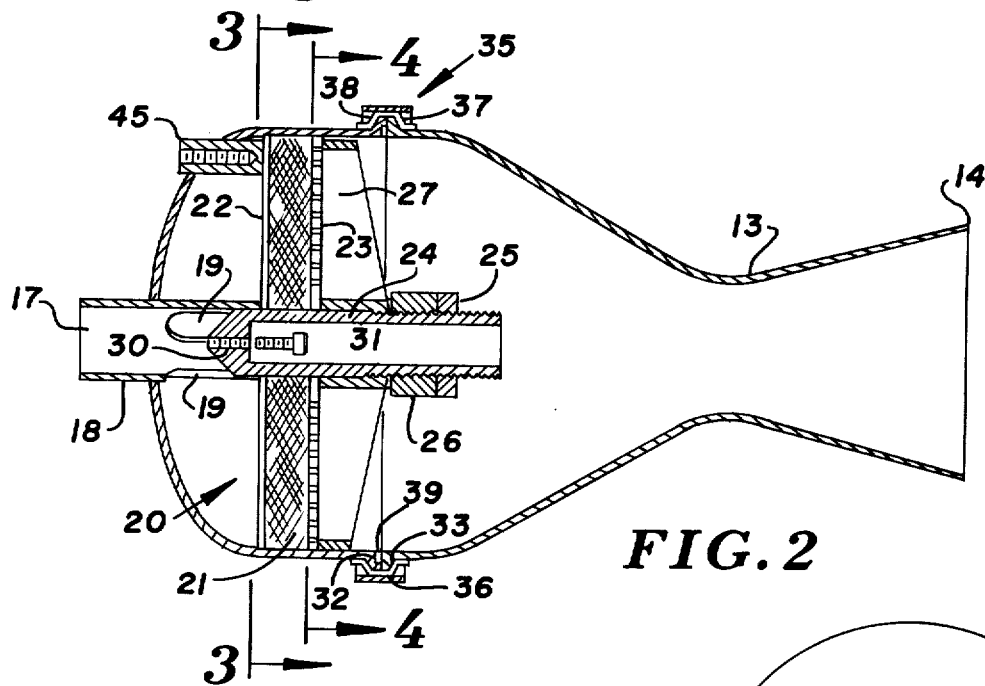
FIG.2
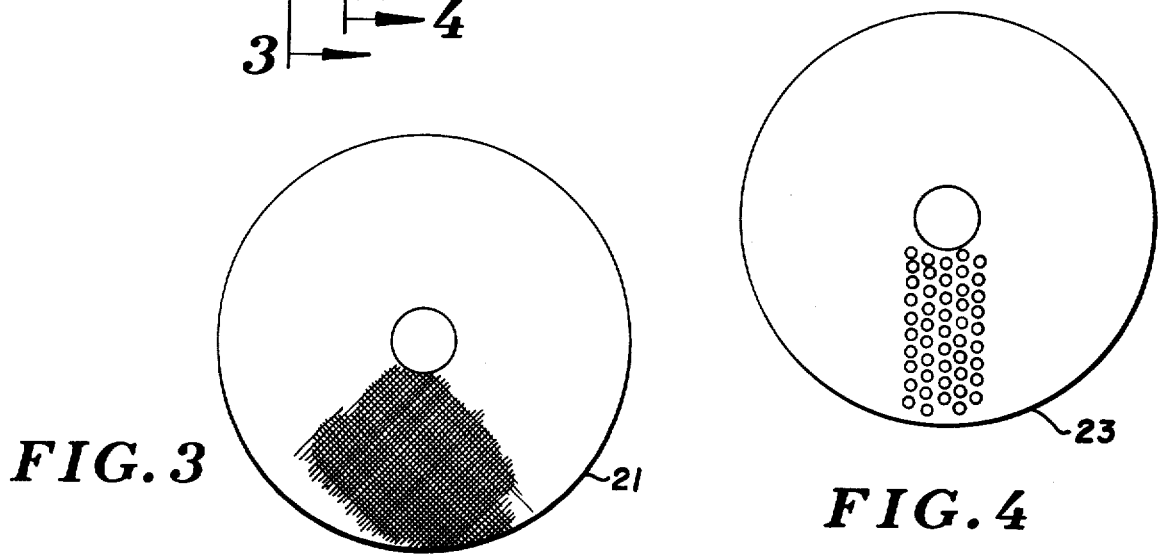
FIG.3
FIG.4

ROCKET MOTOR HOUSING

BACKGROUND OF THE INVENTION

The present invention relates generally to an improved rocket motor housing, and more particularly to such a housing which is formed in two segments joined together by a releasable coupling means. The forward segment is generally cup-shaped to provide an enclosure for the fuel inlet, as well as a portion of the combustion chamber, while the trailing segment normally provides the nozzle means. In accordance with the present invention, coupling means are provided so as to permit rapid release of the exhaust nozzle so as to provide interchangeability of nozzles depending upon the desired acceleration and sustained speed requirements of the load.

In the design of rocket engine thrusters, it is normally required that the housing provide an enclosure for the fuel inlet, the combustion chamber, and the nozzle. The parameters of the inlet and the cumbustion chamber determine the rate at which fuel may be consumed in the device, while the exhaust nozzle characteristics will determine the thrust to be obtained. Since the design parameters of the nozzle determine the power output, gas velocity and the like, it has been found desirable to provide for interchangeability of nozzles in order to characteristically design the rocket motor thruster to the requirements of the load. This will include initial acceleration, sustained travel, and deceleration characteristics.

While a variety of fuels may be employed, it has been found that the present invention is particularly adapted for use in connection with hydrogen peroxide fuel catalytically ignited and burned on screens of silver plated nickel. This provides a silver surface for combustion of the peroxide entering the chamber and coming into contact with the surface. Such a material is, of course, normally commercially available.

The concept of the present invention provides an annular releasable retention ring which rigidly secures the discharge nozzle portion of the casing to the portion of the casing enclosing or housing the fuel inlet and combustion chamber. As such, it is possible to modify the nozzle parameters by means of utilization of interchangeable nozzles.

The design parameters of the combustion portion are well known in the art and require no elaborate discussion. The fuel employed with the silver plated nickel screens is hydrogen peroxide in concentration of between 90 and 98 percent. This material is forced onto the screens under substantial pressures, such as 500 psi or greater. Significant thrust is available from such engines, with thrust being available from such devices of up to 3,500 or 5,000 pounds.

SUMMARY OF THE INVENTION

Therefore, it is a primary object of the present invention to provide an improved rocket motor having interchangeable nozzles, and having means for expeditiously releasing one nozzle for replacement with a second nozzle of varying discharge characteristics.

It is yet a further object of the present invention to provide an improved rocket motor which is simple in design, and which provides for ease of removal of the nozzle discharge portion, for greater accessibility to the catalytic screen pack or stack.

Other and further objects of the present invention will become apparent to those skilled in the art upon a study of the following specification, appended claims, and accompanying drawing.

BRIEF DESCRIPTION OF THE DRAWING

FIG. 1 is a perspective view of the improved rocket motor of the present invention and illustrating the manner in which the segments forming the casing are joined together, one to the other;

FIG. 2 is a sectional view taken through the diameter of the structure, and illustrating the internal arrangements which form the inlet, the combustion chamber, and the discharge nozzle;

FIG. 3 is a vertical sectional view taken along the line and in the direction of the arrows 3—3 of FIG. 2; and FIG. 4 is a vertical sectional view taken along the line and in the direction of the arrows 4—4 of FIG. 2.

DESCRIPTION OF THE PREFERRED EMBODIMENT

In accordance with the preferred embodiment of the present invention, the rocket engine structure generally designated 10 includes a casing formed in a leading segment 11, and a trailing segment 12. Generally speaking, the leading segment is cup-shaped, and houses the fuel inlet, the catalytic screen bed or stack, as well as the initial portion of the combustion chamber. The trailing segment 12 consists essentially of the discharge nozzle, and has a constriction or throat area as at 13 which is interposed along the length of the nozzle. The nozzle terminates in a discharge opening as at 14.

The motor structure 10 further includes a fuel inlet 17 which is in the form of a conduit member 18 with openings as at 19—19 for the introduction of fuel into the combustion area. The catalytic screen pack or stack is shown generally at 20 and includes a graded stack of silver plated nickel screens as at 21, with a pair of support plates 22 and 23 being arranged on either side thereof. A centrally disposed fuel inlet deflector which also functions as a retaining post or the like is shown at 24, with this fuel inlet deflector being secured as by welding or the like to the inner periphery of conduit 18. Fuel inlet deflector 24 is threaded at its opposed free end so as to receive a locking collar 25 and clamping ring 26 therealong. Locking collar 25 and ring 26 serve to hold or compress the radial rib elements 27 against plate 23, so as to provide a compression force for screen stack 21.

It will be observed that a bore or opening is formed in the forward end of member 24, as at 30, this opening being internally threaded so as to receive control screw 31 therewithin. When control screw 31 is removed, a portion of the fuel may move from conduit 18 into the combustion chamber, without passing over the catalytic screen bed, and thereby provide a visible discharge from nozzle opening 14 upon use. The materials of construction will normally be durable elements, such as stainless steel or other equally durable materials. As such, oxidation is retarded and will not tend to permit rapid destruction of the device during use.

As has been indicated, the casing includes a forward segment and a trailing segment which are joined together at a mid-point of the casing. The forward segment is generally cup-shaped with a closed base wall with a generally upstanding annular wall extending therefrom. The upstanding wall terminates along a first generally radially extending annular ring as shown at 32. The trailing segment 12 is in the form of a sleeve having a radial constriction formed along the length, as at 13, and has a leading edge terminating in a second generally radially extending annular ring 33. Coupling means in the form of a releasably openable annular ring are provided as shown generally at 35, with the releasably openable annular retaining ring having a central hoop segment 36 with radially inwardly directed flanges 37 and 38 therealong. Flanges 37 and 38 engage and retain the opposed outer radially directed surfaces of the first and second annular rings, as is best illustrated in FIG. 2. For purposes of integrity of the device, a gasket ring is formed in a relieved zone as at 39.

A pair of radially outwardly extending flanges are provided along the extent of ring 35, as at 40 and 41 in order to provide a means for receiving a locking screw. Such a locking screw is shown in FIG. 1 as at 42. This arrangement provides for ease of assembly and disassembly of the segments forming the motor housing means and are one of a variety which could be employed for this purpose.

It has been indicated that the screen stack 21 includes a graded collection of screens, with the finer screens being present adjacent the inlet, or otherwise adjacent plate 22. The coarser screens are disposed downstream as being adjacent the discharge side or combustion chamber, and accordingly toward plate 23. Such an arrangement enhances the thrust characteristics of the structure and is accordingly preferred. Plate 22 is held in place by a plurality of mounting boss elements 45—45. It will be appreciated that one or more such bosses may be employed for purposes of mounting stability.

In a typical structure, the following materials of construction have been found useful:

| | | |
|---|---|---|
| Leading segment 11 | 347 | Stainless Steel |
| Trailing segment 12 | 347 | Stainless Steel |
| Conduit 18 | 316L | Stainless Steel |
| Plates 22 and 23 | 316 | Stainless Steel |
| Fuel inlet deflector 24 | 316L | Stainless Steel |
| Locking collar 25 | 347 | Stainless Steel |
| Clamping ring 26 | 347 | Stainless Steel |
| Ring 35 | 347 | Stainless Steel |
| Mounting boss 45 | 316 | Stainless Steel |

While stainless steel has been recommended as a material of construction for the casing, it will be appreciated that certain other items may be prepared from ceramics or other thermally durable materials. Thus, the various components making up the retention means for the screen stack such as plates 22 and 23 may be fabricated from materials of construction such as ceramics or the like.

I claim:

1. Rocket motor thruster means comprising:
   a. a casing consisting of a forward segment and a trailing segment joined together at a mid-point, said casing means enclosing and housing a fuel inlet orifice, a catalytic fuel ignition screen plate with a pair of opposed perforate support plates on opposite surfaces thereof disposed in said forward segment, a combustion chamber and exhaust nozzle means, said forward segment being generally cup-shaped with a closed base having a generally upstanding wall extending therefrom and terminating along a first generally radially extending annular ring;
   b. said trailing segment being a sleeve having a radial constriction formed generally mid-way along the length thereof and having the leading end thereof terminating in a second generally radially extending annular ring;
   c. coupling means joining said forward and trailing segments and consisting essentially of a releasably openable annular retaining ring having a central hoop segment with radially inwardly directed flanges at the edges thereof and engaging and retaining the opposed outer radially outwardly directed surfaces of said first and second annular rings; and
   d. central support column means being provided for supporting said opposed perforate support plates, said central support column having a bore formed therein extending therethrough, and a bypass is provided for fuel being disposed within said bore within said central support column means, and extending from said inlet to the exhaust chamber, and said support column terminating in an orifice disposed upstream of said radial constriction.

2. The rocket motor thruster means as defined in claim 1 being particularly characterized in that said ignition screen plate is a stack of perforated mesh screens, with the openings therein increasing in size along a gradient from the forward to the rearward ends of said stack.

3. The rocket motor thruster means as defined in claim 1 being particularly characterized in that three equally spaced mounting boss elements are disposed radially outwardly from said central support column for adjustably supporting said opposed perforate support plates.

* * * * *